United States Patent [19]

Camden et al.

[11] 4,294,876
[45] Oct. 13, 1981

[54] TUFTED MATERIAL HAVING A LAMINATED FILM PRIMARY TUFTING SUBSTRATE

[75] Inventors: James B. Camden, Newcastle Upon Tyne, England; Kenneth D. Vinson, Bartlett, Tenn.

[73] Assignee: The Buckeye Cellulose Corporation, Cincinnati, Ohio

[21] Appl. No.: 145,414

[22] Filed: May 1, 1980

Related U.S. Application Data

[63] Continuation-in-part of Ser. No. 34,059, Apr. 27, 1979, abandoned.

[51] Int. Cl.³ ............................................. B32B 27/16
[52] U.S. Cl. ..................................... 428/95; 428/910
[58] Field of Search .................................. 428/95, 910

[56] References Cited

U.S. PATENT DOCUMENTS

| | | | |
|---|---|---|---|
| 3,428,506 | 2/1969 | Johnstone | 428/910 |
| 3,454,455 | 7/1969 | Rasmussen | 428/910 |
| 3,484,916 | 12/1969 | Johnstone | 428/910 |
| 3,649,431 | 3/1972 | Parker | 428/137 |
| 3,841,951 | 10/1974 | Kim | 428/95 |
| 3,969,472 | 7/1976 | Driscoll | 264/50 |
| 4,039,364 | 8/1977 | Rasmussen | 428/910 |

FOREIGN PATENT DOCUMENTS

| | | |
|---|---|---|
| 944116 | 3/1974 | Canada . |
| 1801800 | 6/1970 | Fed. Rep. of Germany . |
| 1685110 | 8/1971 | Fed. Rep. of Germany . |
| 1595679 | 7/1970 | France . |
| 1113271 | 5/1968 | United Kingdom . |
| 1437179 | 5/1976 | United Kingdom . |

*Primary Examiner*—Marion McCamish
*Attorney, Agent, or Firm*—Milton B. Graff, IV; John V. Gorman; Richard C. Witte

[57] ABSTRACT

A tufted material is disclosed having a primary tufting substrate made up of layers of molecularly oriented film. The layers are laminated together in a generally undisturbed condition so that at least two layers have directions of molecular orientation that are perpendicular. The layers are molecularly oriented to the point of splitting parallel to the direction of said molecular orientation under the tufting needles, allowing the needles to penetrate easily, securing the tufts in place, and resulting in good tuft registration.

7 Claims, 13 Drawing Figures

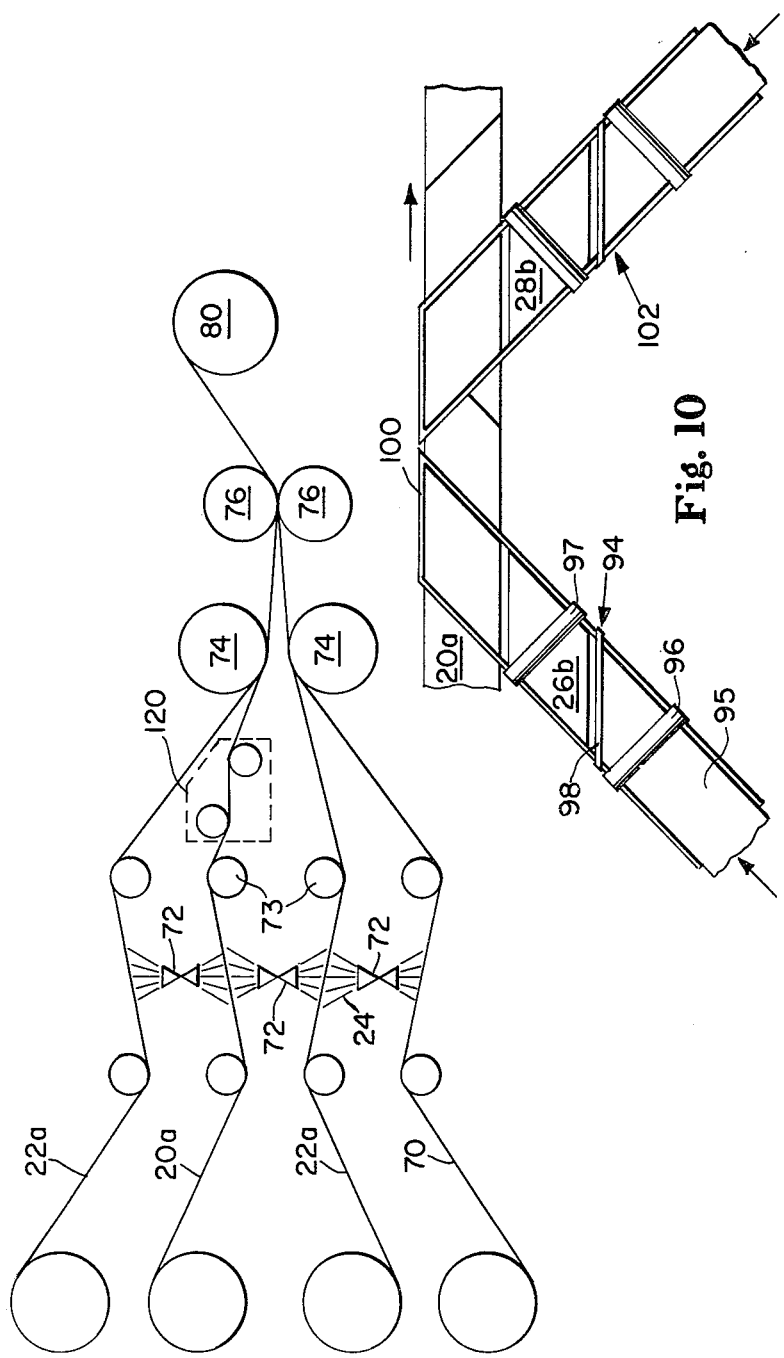

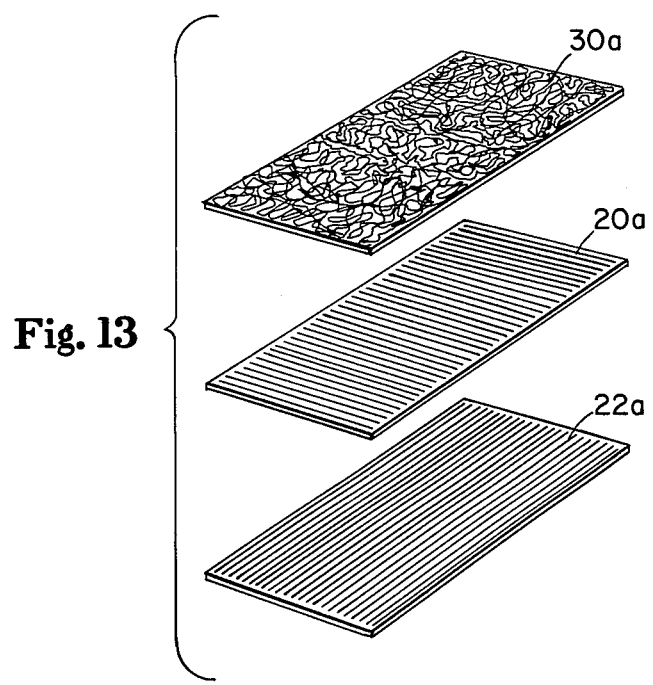

TUFTED MATERIAL HAVING A LAMINATED FILM PRIMARY TUFTING SUBSTRATE

CROSS-REFERENCE TO RELATED APPLICATION

This application is a continuation-in-part of copending application Ser. No. 34,059, filed Apr. 27, 1979 in the name of the present applicants. Application Ser. No. 34,059 is now abandoned.

TECHNICAL FIELD

This invention relates to materials in which tufts of fibers are held by a substrate; in particular it relates to pile strand carpets and tufted upholstery and, more particularly, to pile carpets and tufted upholstery having a laminated film primary tufting substrate and to a method for making such carpets and upholstery. This application describes the tufted materials primarily in terms of pile carpet which is its most substantial commercial use; the descriptions are equally applicable to tufted upholstery material and other tufted materials, and as such, the descriptions of pile carpet are not to be construed as limiting the invention.

BACKGROUND ART

The desire to make quality carpets inexpensively has resulted in interest in various nonwoven fabric primary carpet backings. Since most nonwoven fabrics are notoriously weak they tend to make undesirable carpet backings. However some oriented films have sufficient strength at basis weights acceptable for use as primary carpet backings.

A number of workers in this field have attempted to make a nonwoven fabric from an oriented film suitable for use as a primary carpet backing. These efforts have taken a generally concurrent path. They all involve molecularly orienting a polymeric film by stretching to a degree suitable to induce spontaneous fibrillation, associating the stretched films so that the axes of orientation of the film layers are perpendicular to one another, and mechanically fibrillating the film before or after association. When such a primary carpet backing is tufted, the positioning of the fibrils between the tuft rows with orientation parallel to the fibrils is uncontrolled and non-uniform. As used herein, a film is oriented to the point of "spontaneous fibrillation" when penetration of the film causes splits to occur which extend out from the penetration parallel to the direction of molecular orientation.

U.S. Pat. No. 3,841,951 issued to Kim on Oct. 15, 1974 follows this same path with certain variations. A striated or ribbed film is oriented and then the film region between the ribs is fibrillated producing an open network of filaments interconnected by a plurality of fibrils. The filaments give the final product strength. Canadian Pat. No. 944,116 to Jones issued Mar. 26, 1974 also generally follows this same path. The associated layers are needle punched to produce a felt-like structure. Two U.S. patents to Johnstone, Nos. 3,484,916 issued on Dec. 23, 1969 and 3,428,506 issued on Feb. 18, 1969, disclose similar structures to that described by Jones. In addition British Pat. No. 1,437,179 to Tough issued on May 26, 1976 discloses a similar structure with fibrillation before tufting occuring due to the sewing of the oriented films together.

Although these structures perform adequately as carpet backings, they suffer from certain deficiencies. In particular they possess less than optimal strength and tuft registration.

DISCLOSURE OF THE INVENTION

In accordance with one aspect of this invention a pile strand carpet having a primary carpet backing with pile strand elements tufted through it is described. The pile strand elements have tuft portions which extend through and above the primary carpet backing and which are arranged in substantially orthogonally related sets of rows. The primary carpet backing has at least two bonded layers made up of uniaxially molecularly oriented polymeric material. Each layer is of substantially uniform thickness. The directions of orientation of the layers are substantially at right angles to one another and arranged so that each is parallel to one set of rows of tuft portions. Each pair of adjacent rows of tuft portions in one direction define an elongate segment of primary carpet backing in one layer and each pair of adjacent rows of tuft portions in the other direction define an elongate segment of backing in the other of the two layers. The segments are substantially uninterrupted between each adjacent pair of rows of tuft portions and because of their molecularly oriented polymeric structure they have substantially greater tensile strength in the elongate or length dimension than in the nonelongate or width dimension.

In accordance with another aspect of this invention a method for making pile carpets is disclosed. A laminate is formed which has two undisturbed layers of uniaxially oriented film. Each of the films is substantially uniform in thickness and is drawn sufficiently such that it will split parallel to the direction of molecular orientation upon penetration. The two layers are then bonded together along their surfaces with axes of molecular orientation at approximately 90° to one another. The laminate is preserved in the unfibrillated state until tufting and tufted with pile strand elements.

The tufting operation causes each layer of the laminate to split parallel to its direction of molecular orientation into substantially equal width (assuming the tufting machine needles and timing are set to achieve equal tuft spacing), parallel segments between adjacent rows of tuft portions. Any tufting operation that results in tuft rows parallel to the molecular orientation of the backing layers will result in such parallel segments. Such tufting operations include but are not limited to those employing needle bars with straight or staggered rows of needles, or shifting needle bars, or shifting primary carpet backing.

BRIEF DESCRIPTION OF THE DRAWINGS

FIGS. 3 and 13 is a schematic exploded perspective view showing the films comprising the primary carpet backing shown in FIGS. 1 and 2 prior to laminating and tufting.

FIG. 9 is a schematic elevational view of one process used to laminate the drawn film layers together in forming a primary carpet backing for the present invention.

FIG. 10 is a fragmentary schematic plan view of equipment which can be used to incorporate bias films in the laminate process of FIG. 9.

DETAILED DESCRIPTION OF THE INVENTION

Figure 1:
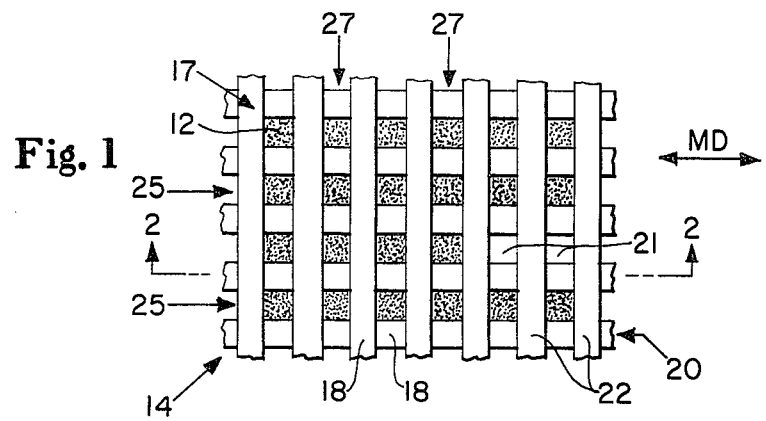
FIG. 1 is a fragmentary schematic plan view of one embodiment of a carpet of this invention.
Figure 2:
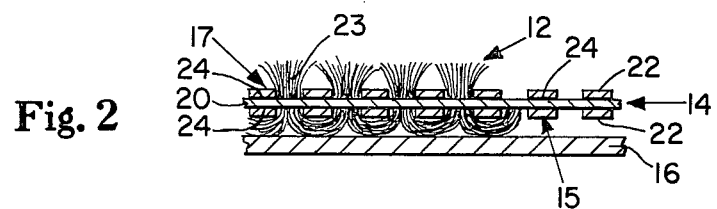
FIG. 2 is a cross-sectional view taken along the line 2—2 in FIG. 1.

Referring to the drawings wherein like reference characters are utilized for like parts throughout the several views, there is illustrated in FIGS. 1 and 2 a tufted carpet having pile strand elements 12, a primary carpet backing 14, and a secondary backing 16. The pile strand elements 12 are tufted through the primary carpet backing 14 by a conventional tufting process in which a tufting machine having one or more rows of needles, needles a loop of yarn through the primary carpet backing 14 from backstitch side 15 to pile side 17 of the primary backing 14. The pile strand elements 12 shown schematically in FIG. 1 are cut pile elements, the loops having been cut after they were passed through the primary carpet backing 14. However, any method of pile tufting can be used in making this invention. The secondary backing 16 is adhesively secured to the backstitch or non-pile side 15 of the primary backing 14 and to the pile strand elements 12. Any conventional secondary backing may be used, such as foam or jute, and any conventional means of securing the secondary backing to the primary backing can be used, including adhesive attachment.

As used herein, the term "carpet machine direction" means the direction in which the carpet is moved during tufting past the row of tufting needles, this direction normally being parallel to the length of the carpet. Thus the "carpet cross-machine direction" is the direction perpendicular to the carpet machine direction.

The primary carpet backing is made up of at least two layers, each layer in turn having a plurality of parallel elongate segments 18. The segments 18 are molecularly oriented in their elongate direction. Machine direction layer 20 has its parallel segments 18 arranged with their elongate dimension substantially parallel to the carpet machine direction shown by the arrows in FIG. 1. In FIG. 1, a preferred embodiment, machine direction layer 20 is sandwiched between two cross-machine direction layers 22, each having its segments 18 arranged with their elongate dimension substantially parallel to the carpet cross-machine direction.

Each segment 18 is spaced from its adjacent segments in its layer a distance approximately equal to the width of the pile strand elements 12. The width of the machine direction layer segments is determined by the spacing between tufting needles which is known as the machine gauge. Machine gauge is the specification of tufting needle spacing measured in the carpet cross-machine direction. Similarly the width of the cross-direction layer segments is set by the selection of stitch rate (usually in strokes per minute) and the speed which the primary carpet backing is moved past the tufting needles. The stitch count specifies the number of tufts per unit length in the machine direction.

Thus each pile strand element 12 is secured between a pair of adjacent machine direction layer segments and two pairs of adjacent parallel cross-direction layer segments above and below the respective machine direction layer segments. This arrangement creates a series of uniformly spaced openings 21, each of which is filled by a pile strand element 12. The two unfilled openings 21 shown in FIG. 1 are for illustration purposes only. It can be seen from FIG. 2 that the pile strand elements 12 are essentially U-shaped fiber bundles with the base of the "U" being held between the secondary backing and the segments 18 of cross-machine direction layer 22.

The tuft portions 23 of the pile strand elements 12 extend through and above the primary backing 14. The tuft portions 23 shown schematically in FIG. 1 extend straight upwardly for illustration purposes only. Normally the portions 23 spread out and hide the primary backing 14. As can be seen from FIG. 1 the exposed tuft portions 23 are arranged in uniformly spaced horizontal rows 25 and vertical rows 27 which are substantially perpendicular to one another. It can be seen from FIG. 1 that each pair of adjacent horizontal rows 25 of tuft portions 23 define a segment 18 in one of the layers of the primary backing 14. Similarly each adjacent pair of vertical rows of tuft portions 27 define a segment 18 in another layer of the backing 14 having segments 18 perpendicular to the segments defined by the rows 25.

It is essential that the primary carpet backing not be subjected to splitting before tufting. This will result in segments 18 which in the areas between the adjacent rows of tuft portions 23 are substantially uninterrupted after tufting and which therefore possess film-like strength.

Figure 3:
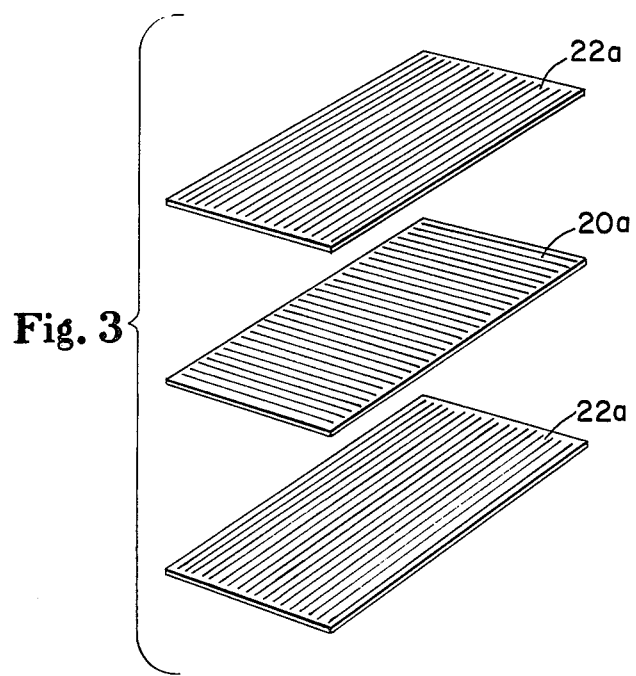

The construction of the primary carpet backing 14 and the arrangement of the layers before tufting is shown in FIG. 3. Each of the layers, which in the final product is made up of a plurality of parallel segments 18 is originally a uniaxially molecularly oriented film of substantially uniform thickness. Preferably the layers 20 and 22 each have a basis weight of from 10 to 60 grams per square meter. Machine direction layer 20 is originally an oriented polymeric film 20a arranged with its direction of orientation in the carpet machine direction and cross-machine direction layers 22 are originally oriented polymeric films 22a arranged with their direction of molecular orientation in the carpet cross-machine direction. The films are bonded together along their surfaces in the arrangement shown in FIG. 3 and tufted as explained above. Normally no discernable change in basis weight of the layers occurs due to tufting.

Because the films are oriented to the point at which they will split when penetrated, the action of the tufting needles in penetrating the uniaxially oriented films normally causes them to split to form the structures shown in FIGS. 1 and 2, composed of a plurality of parallel segments 18. If the machine gauge is unusually high or the stitch count is unusually low, one or more of the layers of the primary carpet backing may not be totally split. Then splits will occur on each side of the needle hole parallel to the direction of molecular orientation but the splits will not connect from hole to hole in the direction of orientation. In this case the segments 18 are not separated from adjacent segments but are defined by rows 25 or 27 of tuft portion filled needle holes and adjacent unconnected film splits.

The tuftability and tuft registration of carpet backings made in accordance with this teaching are believed to be due to the splitting action of the films under the tufting needles. The oriented films split allowing easy penetration. The splits in the perpendicular layers of film then hold the tuft portions in position. It is believed then that the tuft registration which these backings possess is due to needle acceptance rather than needle avoidance or the tendency of fibers to move out from under the tufting needle which is the case with fibrillar structures.

The films 20a or 22a may be discontinuous sheets or relatively continuous strips. The dimensions of the layers are determined by the process used to make the backing as will be explained later.

The primary carpet backing may be made up of two or more layers at least two of which are arranged with their directions of molecular orientation perpendicular. The three layered structure described above is preferred since it is comprised of a low number of layers but possesses sufficient tufted interlayer bonding. However, the carpet backing 14 may be made up of a plurality of similarly oriented layers laminated to a plurality of oppositely oriented layers and it is not necessary to alternate machine and cross-machine direction layers.

Figure 4:
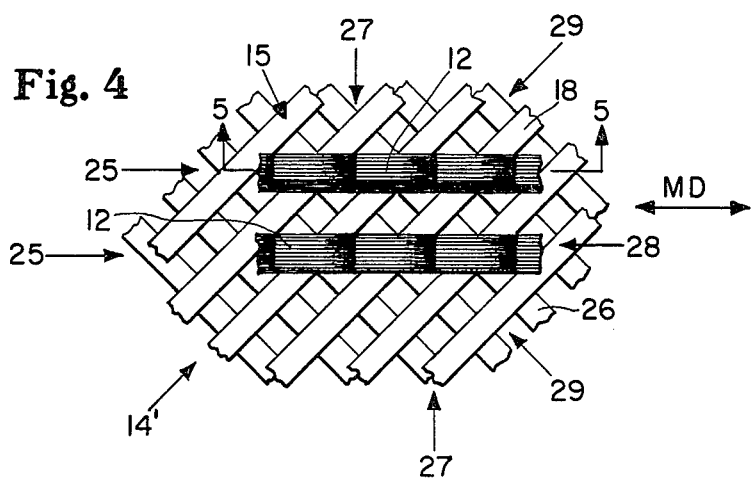
FIG. 4 is a fragmentary schematic plan view of the backstitch side of another embodiment of a carpet of this invention, in partially tufted condition.
Figure 5:
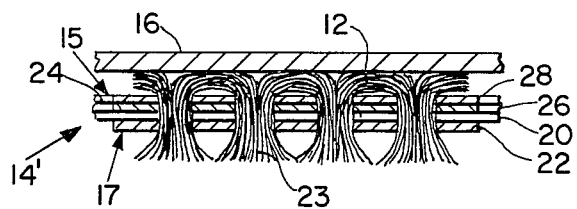
FIG. 5 is a cross-sectional view taken along the line 5—5 in FIG. 4.

A four layer carpet backing 14' is illustrated in FIGS. 4 and 5. The backing 14' is identical in operation and structure to the backing 14 except one of the cross-direction layers 22 of the backing 14 is replaced by two bias layers 26 and 28 to give the carpet a greater resistance to deformation in the bias directions which are at 45° clockwise and counterclockwise to the carpet machine-direction. The bias layers 26 and 28 also have segments 18 with their elongate direction parallel to the bias directions and directions of molecular orientation parallel to their elongate dimension. This means that machine direction layer 20 segments 18 are arranged parallel to the carpet machine-direction, cross-machine direction layer 22 segments 18 are arranged at approximately 90° to the carpet machine direction, clockwise bias layer 26 segments 18 are arranged at approximately 45° clockwise to the machine direction and the counterclockwise bias layer 28 segments 18 are arranged at an angle of approximately 45° counterclockwise to the machine direction. The carpet machine direction is indicated by an arrow in FIG. 4.

In order to create bias layers 26 and 28 with segments 18 that are uninterrupted it is necessary that the backing be tufted with the machine gauge equal to the reciprocal of the stitch count. This results in a spacing between adjacent tuft portions 23 in the carpet machine direction equal to the spacing between adjacent tuft portions in the carpet cross-machine direction. The result is that segments 18 are created with their elongate direction at 45° to the carpet machine direction.

It is preferred to have the bias layers 26 and 28 on the backstitch side, and the machine direction layer 20 adjacent to one of the bias layers as this gives better tuft bind. However any ordering of the layers can be used to achieve comparable results.

Figure 6:
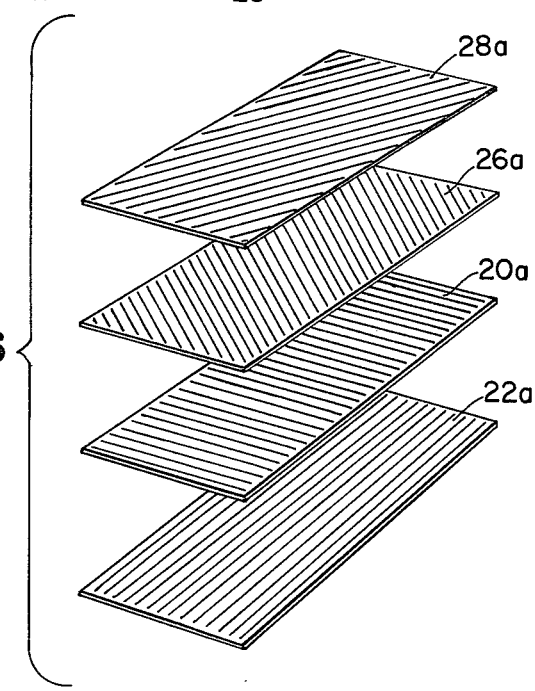
FIG. 6 is an exploded schematic perspective view of the films comprising the primary carpet backing shown in FIGS. 4 and 5 prior to laminating and tufting.

The arrangement of the layers and the method of construction of the primary carpet backing 14' is shown in FIG. 6. The layer 20 is originally an oriented film 20a arranged with its direction of orientation parallel to the carpet machine direction. The layer 22 is originally a film 22a arranged with its direction of molecular orientation parallel to the cross-machine direction and layers 26 and 28 are originally films 26a and 28a arranged with their directions of orientation in the bias directions. Since the layers 20 and 22 carry most of the stress put on the carpet, the layers 26 and 28 preferably have a lower basis weight than the layers 20 and 22 in order to keep the backing basis weight as low as possible. The bias layers 26 and 28 preferably each have a basis weight of from 5 to 20 grams per square meter. The layers are laminated together and tufted. The action of the tufting needles on the highly oriented films causes them to split, under normal conditions, forming the parallel segments which make up the respective layers of the primary carpet backing 14'.

A preferred embodiment of the invention achieves extra strength in the bias directions by including a layer of fibrous, nonwoven material as one layer of the carpet backing. The arrangement of layers and the method of construction of an exemplary three layer carpet backing is illustrated in FIGS. 3 and 13. Oriented film 22a is arranged with its direction or orientation parallel to the cross machine direction, and oriented film 20a is arranged with its direction of orientation parallel to the carpet machine direction as previously described for other embodiments of the invention. Layer 30a is a fibrous, nonwoven material having a basis weight from 10 to 40 grams per square meter. It is generally preferred to have the fibrous material layer 30a on the pile side since it can be made of a dyeable material. The machine direction layer 20a is preferred adjacent to the fibrous material, and the cross machine layer 22a on the backstitch side. However, any ordering of the layers can be used to achieve comparable results.

The layers are laminated together and tufted. The fibrous layer does not split along lines parallel to the rows of tufts as the molecular oriented layers do.

Examples of fibrous, nonwoven materials which can be used in this embodiment of the invention include spunbonded materials, air-laid staple length webs, and needled fabrics. The purpose of the fibrous material is to provide strength to the carpet backing especially stretch resistance in the bias directions with minimal weight addition. Also, needle deflection by the fibrous material should be minimal so that tuft registration is not adversely affected. The size, strength, composition, and density of the fibers and the strength of the web of the fibrous material are balanced to achieve the desired characteristics. A preferred fibrous material is a spunbonded nylon; others include spunbonded polypropylene and polyester.

Each of the layers of primary carpet backing 14 or 14' is made of oriented polymer film (except the fibrous nonwoven material). The preferred polymers are polypropylene and linear polyethylene since these provide a good balance of strength and low cost. However any orientable polymeric film having an unbranched molecular chain which after such orientation exhibits the ability to split parallel to the direction of molecular orientation when penetrated can be used. It is preferred to use films which have been subjected to foaming during the extrusion process. Foamed films are made by expanding the molten polymer with a blowing agent as it is extruded. The inclusion of bubbles within the film structure makes the film more tuftable due to its lower density and more easily orientable since void regions are provided which facilitate the structural changes which occur during stretching and orientation of the film. It has also been found that the oriented film is more flexible after orientation than the non-foamed film. In addition the stretched foamed film has a rougher surface and therefore better adhesive bonds can be formed between films.

It is preferable to create small bubbles in the film which are as close to spherical as possible when making the foamed film for use in this invention. A foamed film density of 0.5 grams per cubic centimeter, an average cell volume of $7.8 \times 10^{-6}$ cubic centimeters and an average bubble length to width ratio of 2.6 is obtainable by conventional processes. A suitable blowing agent for creating the bubbles is azodicarbonamide at an amount approximately equal 0.1% by weight.

Regardless of the type of film used, each of the films used to make the layers of the primary carpet backing is uniaxially oriented (except the fibrous, nonwoven material). All the films may be uniaxially oriented in their longitudinal direction and then combined with the other oriented films by cross-lapping or other suitable processes to get the desired arrangement of layers. Alternatively the layers can be oriented in the desired direction across the width of the film as described hereinafter. In any case the elongate direction of the segment 18 is always parallel to its direction of molecular orientation. It is preferred that the films have a tensile strength in excess of $2.75 \times 10^7$ kg./sq. meter in the oriented direction and a tensile strength of less than $2.1 \times 10^6$ kg/sq. meter in the direction perpendicular to the direction of orientation. The films preferably are of a density of between 0.5 grams per cubic centimeter and 0.9 grams per cubic centimeter.

The machine and cross-machine direction layers may have different tensile strengths. Since the knife-like tufting needles are longer in the machine direction than in the cross-machine direction, they make longer cuts across the strength direction in cross-machine direction layers 22 than in machine direction layer 20. This results in a reduction in strength in cross-direction layer 22 which is greater than that in machine direction layer 20, which can be compensated for by using extra cross-machine direction layers as described above or greater thickness of the cross-machine direction layers. However, it is preferred to develop greater cross-direction strength and a higher level of splitability in the cross-direction orientation process rather than by using thicker film.

An adhesive 24 is used to secure the layers of the primary carpet backing together. The adhesive may be either pressure sensitive or heat sensitive. A suitable pressure sensitive and heat sensitive adhesive is No. 4693 made by the 3M Corporation of St. Paul, Minn. applied by spraying. This is an epoxy adhesive made of a synthetic elastomer having 24% solids by weight suspended in a solvent mixture of cyclohexane and methylene chloride. It has been found that with pressure or heat sensitive adhesive sufficient interlayer bonding exists after tufting despite the fact that the film layers spread apart in different directions when tufted.

Alternatively the films may be made with a co-extruded polymer on their facing surfaces. The co-extruded polymer on the facing surfaces has a lower melting temperature so that the layers can be bonded together by the application of heat and pressure, without affecting the strength of the layers of the carpet backing. With polypropylene base film, polyethylene is an example of a suitable co-extruded polymer. The process for laminating the layers together is discussed in more detail hereinafter.

The primary carpet backing preferably has a bonded basis weight of between 80 and 200 g./m.$^2$. Regardless of the bonding method the bonding agent should be applied in a basis weight of between 10 and 30 g./m.$^2$ and result in a bond (peel) strength before tufting of from 180 to 1800 grams/centimeter.

Conductive carbon filaments can be added between the layers of the backing 14 for static control. Preferably, the filaments are applied at minimum basis weight and approximately 0.3 grams per square meter has been found sufficient. When the carpet is tufted, the filaments will be pushed towards the surface of the backing so that they will be effective in controlling static electricity.

A layer of dyeable material may also be added to the pile surface of the primary backing. By applying dyeable nylon fibers on the pile side of the primary backing the backing may be dyed so that it will match the color of the pile strand elements 12. Preferably a layer of melt blown nylon is laminated to the primary carpet backing before tufting at a minimum basis weight. A basis weight of approximately 10 grams per square meter of melt blown nylon is sufficient. Alternatively a dyeable layer of nylon film can be co-extruded on the pile side of the film that forms the pile side layer. In any case it is preferred that the dyeable layer not be secured by needling, as is conventional in the art.

The general process used to produce the carpet is to extrude and draw at least one film, laminate at least two film layers together in an appropriate arrangement to form a backing, and then to tuft the backing using a conventional tufting machine. Since greater efficiency is possible with continuous films rather than with cut sheets of film, it is preferred to continuously draw the film either in the film length or width directions as required. As used herein "film machine direction" and "film" cross-machine direction" are the length and width directions of the film and do not necessarily have any relation to carpet machine or cross-machine direction. Different techniques must be used to draw the film in the film machine or length direction than are used to draw the film in the film cross-machine or width direction because of the narrow cross-direction width and the long machine direction length. Although continuous processes are described hereinafter the backing can be made by continuously orienting one film and then laying cut sheets of oriented film across the width of the first film to create a backing with layers having different orientations.

Figure 7:
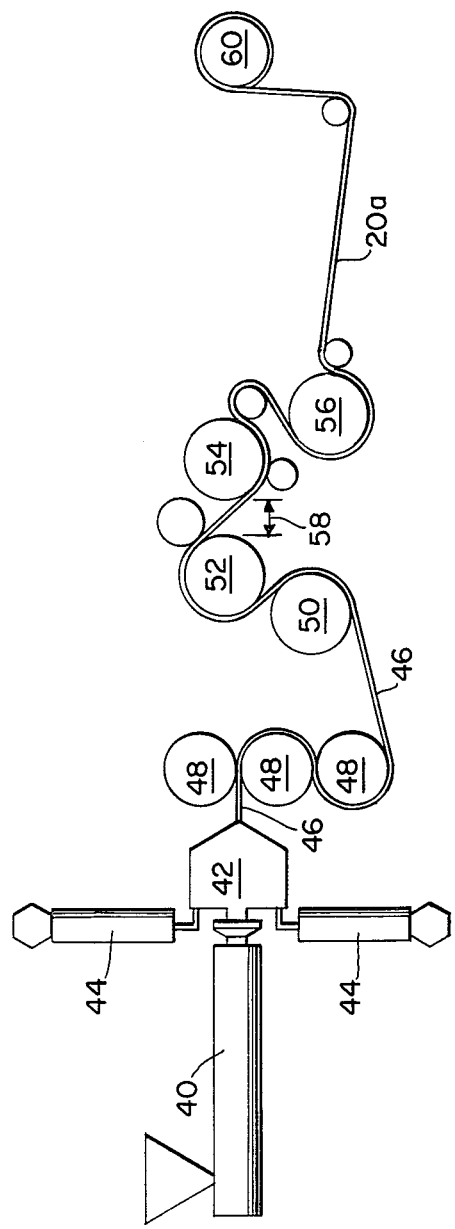
FIG. 7 is a schematic elevational view of the process used to form and stretch film in the machine direction of the film.

FIG. 7 shows the process for making machine direction oriented film. The film is formed by adding polymeric material usually in pellet form to extruder 40 which preferably is at approximately 200° C. The extruder forms a thin sheet of polymer which exits from multi-manifold flat die 42. Satellite extruders 44 can be used to co-extrude additional layers onto either or both sides of the base film layer formed by extruder 40. For examle, a dyeable polymer such as nylon can be co-extruded for dyeability or a low melting polymer can be co-extruded to enable the layers of the carpet backing to be bonded together by the application of heat and pressure. The unstretched film 46 is then passed between a set of three chill rolls 48. Preferably the chill rolls are at a temperature below 65° C. to quickly chill the film.

The unstretched film 46 is next passed to a machine direction orienting section. This section consists of a pre-heat roll 50, a pair of differential speed drawing rolls 52 and 54, and a heat set roll 56. The differential speed rolls 52 and 54 can achieve draw ratios of from 5:1 to 13:1 by varying the relative speed of the roll 54 with respect to the roll 52 and by adjusting the draw gap 58 which is the distance between the rolls. It is preferred that the draw gap be greater than 10 centimeters to allow sufficient room for neck-in to occur. The pre-heat roll 50 is at from 90° to 150° C. with a temperature of 120° C. being preferred. The heat set roll 56 is at from 140° C. to 150° C. The machine direction oriented film 20a is then collected on winder 60. Film 46 speeds of from 3 to 90 meters per minute have been used successfully.

Figure 8:
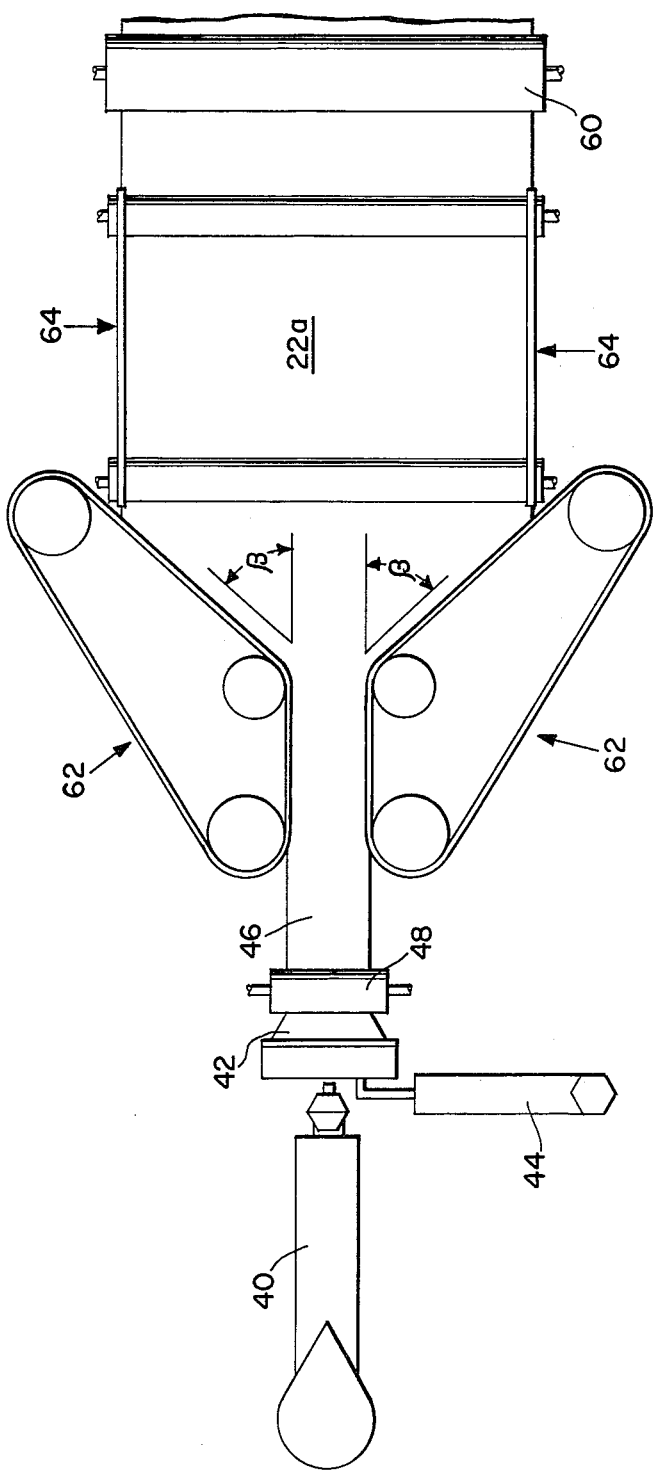
FIG. 8 is a schematic plan view of the process used to form and stretch film in the cross-machine direction of the film.

FIG. 8 shows a top view of the cross-machine direction film orienting apparatus. It is more difficult to orient film in a direction opposite to that in which it is moving in a continuous manner because the forward movement tends to frustrate or counteract the lateral stretching.

One practical method for stretching the wide films used in making the carpet backing is a process described in U.S. Pat. No. 3,501,565 issued to Kalwaites on Mar. 17, 1970 as improved upon in U.S. Pat. No. 3,577,586 issued to Kalwaites on May 4, 1971. These two patents are hereby expressly incorporated by reference herein. These patents describe cross-direction orienting processes which avoid the effect of longitudinal motion by decelerating in the longitudinal direction thereby lessening the effect of longitudinal motion while stretching in the cross or transverse direction.

The film forming apparatus used to make cross-direction oriented film 22a is similar to that used in machine direction orienting, there being an extruder 40, a satellite extruder 44, a multi-manifold die 42, and a set of chill rolls 48. The unstretched film 46 is then gripped by a clip tenter frame 62 which redirects the film transversely. As described in the kalwaites '565 patent this causes a deceleration of the film in the longitudinal direction allowing neck-in and transverse stretching to occur. As in the case of machine direction orientation a draw ratio of from 5:1 to 13:1 is preferred. The angle beta of divergence of the tenter frame is preferably less than 60° but greater than 20°. The decelerated film is then removed from the clip tenter by a pair of mating belts 64 which grip the edges of the film and allow it to cool without contraction. The cross-oriented film 22 is then collected on a winder 60.

Other means of continuously forming cross-directionally oriented films 22a may be used as well. For example, any conventional cross-lapping process may be used to laminate carpet backing layers with generally perpendicular directions of orientation. In cross-lapping two films are oriented in the machine direction using the process shown in FIG. 7 or the equivalent. Then one of the films is applied in a continuous motion back and forth across the first film. The Kim patent referenced earlier describes a cross-lapping process suitable for use with this invention. The disclosure of that patent is hereby expressly incorporated by reference herein.

Alternatively, the cross-direction layer can be created by a set of ribbed rolls which grab the film at spaced points across its width and cause it to stretch by the action of the mating ribbed rolls. An exemplary apparatus of this type is disclosed by Mercer in U.S. Pat. No. 4,087,226 issued on May 24, 1976. The disclosure of that reference is hereby incorporated by reference herein.

FIG. 9 shows a process for laminating the film layers together to form the primary carpet backing. This process involves activating an adhesive and combining the layers. Machine and cross-machine direction oriented films 20a and 22a are unwound from reels, and an optional nylon layer 70 may also be unwound from an identical reel. Additional layers of film can be unwound from identical reels as desired. If biased oriented film will be used, an additional station 120, represented by a dotted line enclosure, must be provided to apply these films as described hereinafter. In the embodiment pictured in FIG. 9 each of the layers is passed over an adhesive applicating station 72, where adhesive is sprayed onto the surfaces of the films, preferably covering substantially the entire surfaces sprayed. If heat activatable adhesive is used, the webs are then conveyed to a heating roll 74 which softens the heat activatable adhesive. Finally the piles are passed through the nip of a set of combining rolls 76 biased together by a force from 900 to 1800 grams per linear centimeter and reeled onto a winding roll 80.

The bias films 26a and 28a, if desired, are added at station 120 shown by a dotted line enclosure between idler rolls 73 and heating roll 74 in FIG. 9 and shown in greater schematic detail in FIG. 10. When bias films are applied the upper film 22a is not applied. The film 20a moves in the direction indicated by the arrow in FIG. 10. The means for applying the bias films include delivery means 94 and 102 arranged in the bias directions with respect to the film 20a longitudinal direction.

The delivery means 94 unwinds a roll (not shown) of film 95 molecularly oriented in the longitudinal direction of the film. Preferably a heat activatable adhesive has been preapplied to the film as described above with respect to films 20a and 22a. As the film is forwarded by driven rubber roller 96, a cut is made across the film at 45° to the longitudinal direction of the film by means of cutter 98. The cut sheets 26b are forwarded by means of driven roller 97 over the film 20a and guided onto the film 20a by guide means 100. Sheets 26b are laid side by side as the underlying plies advance, to create the bias film 26a previously described, each sheet having its direction of molecular orientation at 45° to the longitudinal direction of the film 20a. The sheets 26b are of sufficient length to extend from one side of film 20a to the other.

The delivery means 102 applies the bias film 28a on top of the layer applied by delivery means 94 but with the direction of molecular orientation of the sheets 28b formed by means 102 at 90° to the direction of molecular orientation of the sheets 96 applied by means 94. The delivery means 102 is the mirror image of the means 94. The delivery means disclosed in U.S. Pat. No. 4,084,464 issued to Bowers on July 27, 1970 can be used as the delivery means 94 and 102. The disclosure of the Bowers patent is hereby expressly incorporated by reference herein.

The film 20a with the bias films superposed on it then proceeds to heating roll 74, shown in FIG. 9, as described above. The roll 70 which provides a dyeable pile surface layer, if desired, may be applied as before.

The finished primary carpet backing 14 or 14' is then tufted using a conventional tufting apparatus. The action of the tufting needles against the unfibrillated film carpet backing normally causes splits to develop in the oriented film layers as described previously.

The following examples illustrate and expand on the practice of this invention and describe its important parameters.

EXAMPLE 1

A three layered carpet backing was formed from prefoamed films. A film molecularly oriented in one direction was sandwiched between two sheets of film molecularly oriented in a perpendicular direction.

Polypropylene film with a density of 0.5 grams per cubic centimeter, an average cell volume of $7.8 \times 10^{-6}$ cubic centimeters, and an average ratio of cell length to cell width of 2.6 is utilized. The foam was made by casting it into a water bath as it exited the die. Each unoriented film sheet had a basis weight of 190 grams per square meter.

The films were oriented using differential speed rolls. A draw temperature of 130° C. and a draw ratio of 9 to 1 was used. Bonding was accomplished by spraying 3M4693 adhesive in approximately equal amounts between each pair of facing layers. A DeVilbiss Model JGA-502 sprayer available from DeVilbis Company of Toledo, Ohio with a 45 air cap was used to achieve a total adhesive basis weight in the backing of about 15 grams per square meter. The laminated films had a total basis weight of 110 g./m.$^2$ and each layer had a basis weight of about 32 g./m.$^2$ excluding any adhesive.

A light nylon melt blown web having a basis weight of 10 grams per square meter was added to the pile surface of the carpet backing to provide for dye acceptance. Because of its light basis weight and weak fiber strength the nylon layer was found to have no effect on tufting performance.

The sample was then tufted on a Southern Machine Company 42' (107 cm.) wide tufter Model Tuftco #11042878 under the following conditions. Eisbar #1212B needles at an angle of 6.9° were used to tuft the samples held under medium tension with Chevron two ply nylon Saxony 1300 denier yarn also under medium tension. A 1/10" (0.254 cm,) machine gauge and a stitch count of 4.3 stitches per centimeter and a stitch rate of 374 strokes per minute were used.

Figure 11:
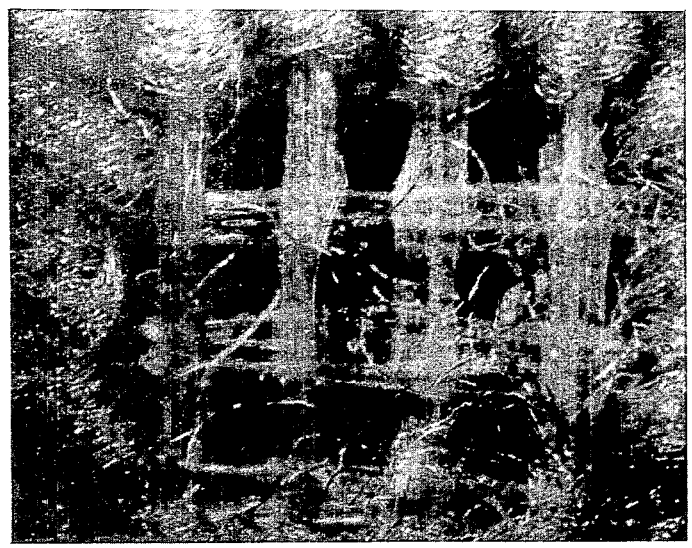
FIG. 11 is a photograph taken at 10X magnification from the backstitch side of the embodiment of carpet of the present invention illustrated in FIGS. 1-3, having tufts removed from the central region.

Some of the tufts were removed and the exposed carpet backing was photographed on the backstitch side. The photograph taken under 10× magnification is reproduced herein as FIG. 11; it shows the substantially uniform thickness and spacing of the parallel segments 18.

The tensile strength of the backing and the tufted carpet and the power required to tuft the backing is summarized in the table below. Also included are the tensile strength and power required to tuft two well known commercially available carpet backings, Typar and woven polypropylene which were tufted under conditions identical with those described above. Typar is the tradename which designates a continuous filament spunbonded fabric made by E. I. DuPont de Nemours. The Typar sample had a basis weight of 100 g./m.$^2$. The woven polypropylene was obtained from Patchogue-Plymouth, a division of Amoco sold under the tradename Polybac. The sample had 9.4 warp ends per centimeter of 500 denier by 4.3 weft ends per centimeter of 1000 denier with a basis weight of 120 g./m.$^2$. The power required to tuft each of the three described primary backings was measured on a 24 needle machine with a 5/32" (0.397 cm.) gauge. A stitch rate of 200 stitches per minute was used with a stitch count of 3.2 stitches per centimeter. This pilot plant type of equipment is more easily adapted to such measurements than the commercial model described above and is believed to provide valid comparative data for power needs.

|  | Tensile g./cm. Before Tufting | | Tensile g./cm. After Tufting | | Tensile g./cm. Finished carpet | | Power Required to Tuft (Current in Amps Drawn At 110 Volts) |
|---|---|---|---|---|---|---|---|
|  | MD | CD | MD | CD | MD | CD |  |
| Three Layer Laminate | 8,600 | 15,600 | 5,370 | 7,160 | 18,600 | 21,500 | 1 |
| Typar | 6,620 | 6,620 | 2,150 | 179 | 15,000 | 14,300 | 1.2 |
| Woven Polypropylene | 14,900 | 11,600 | 11,100 | 8,200 | 15,600 | 24,700 | .7 |

EXAMPLE 2

A carpet backing identical to the three layer laminate of Example 1, except that nonfoamed film and more adhesive was used, was prepared as follows: Three layers of polypropylene film were extruded with a viscosity defined by ASTM D1238 to be a melt flow index of 4.0 (hereinafter "melt flow index"). Each film was drawn at a draw ratio of 5 to 1 to produce a 1.5 mil (0.038 mm) film having a basis weight of 34 grams per square meter. The drawn film was purchased from Ensign Bickford of Simsbury, Connecticut. A total backing adhesive basis weight of 25 grams per square meter equally distributed between the layers was used.

The sample was then tufted on the 42" tufter described in Example 1 under the conditions described in Example 1 with respect to this tufter. The resulting carpet had qualities similar to the carpet made in accordance with Example 1.

EXAMPLE 3

A carpet backing having four layers of molecularly oriented foamed films were prepared. All four layers were made of foamed polypropylene film with a density of 0.5 grams per cubic centimeter and an average ratio of cell length to width of 2.6, drawn at a ratio of 9:1 at 130° C. Machine and cross-machine layers were made by molecularly orienting two films each having a basis weight of 190 grams per square meter before orienting and a basis weight of 32 grams per square meter afterwards. The two other films were lighter, having a basis weight after orientation of 7 grams per square meter. The carpet backing was formed by laminating the films together, as shown in FIG. 6, with the heavier layers being bonded together with their directions of molecular orientation perpendicular, and the lighter layers being bonded together with their directions of orientation perpendicular to each other and bonded at 45° to the direction of orientation of each of the heavier layers, one of the lighter layers forming the backstitch side of the backing and the other being bonded to one of the heavier layers.

The layers are laminated together with 3M 4693 adhesive having an overall basis weight in the backing of 15 grams per square meter applied in approximately equal amounts between each pair of facing films.

Figure 12:
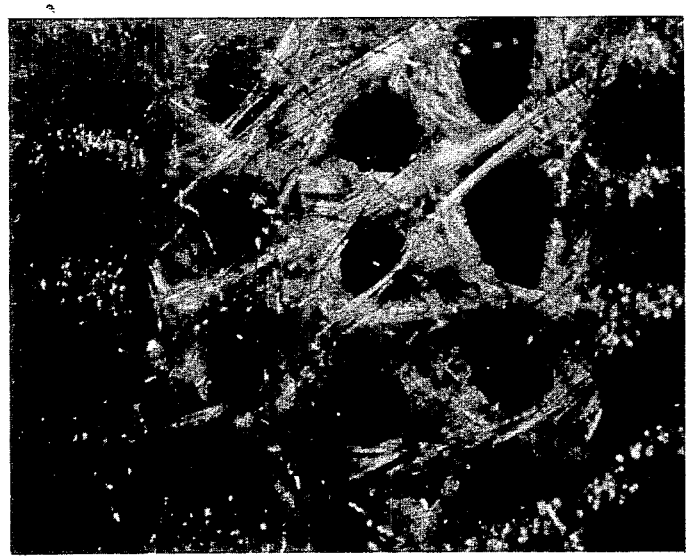
FIG. 12 is a photograph taken at 10X magnification from the backstitch side of the embodiment of carpet of the present invention illustrated in FIGS. 4-6, having tufts removed from the central region.

The carpet backing was then tufted on the 42" tufter of Example 1 in accordance with the practice outlined in Example 1 with respect to this tufter. Some of the tufts were removed from the sample and a photograph was taken at 10X magnification from the backstitch side of the carpet. The photograph is reproduced herein as FIG. 12.

The samples had a bias tensile strength of 603 grams per centimeter and a bias modulus of 7,670 grams per centimeter. In comparison, the sample described in Example 1 exhibited a bias tensile strength of 137 grams per centimeter and a bias modulus of 460 grams per centimeter.

EXAMPLE 4

Foamed film was formed in a process identical to that described with respect to Example 1, except that a non-foamed 1.5 mil (0.038 mm.) thick low density polyethylene melt was simultaneously extruded on both sides of a 21 mil (0.53 mm) thick base polypropylene film. The composite film was then drawn at a temperature of 130° C. between differential speed rolls to produce a draw ratio of approximately 9 to 1. A three layered structure with outer plies having their oriented direction perpendicular to the inner ply was then formed. A 10 gm./m.$^2$ basis weight nylon melt blown layer was added on top of the three layers. All four layers were then placed in a Carver laboratory press at 140° C., $1.3 \times 10^5$ Kg./m.$^2$, for 5 minutes. The carpet backing was then tufted on the 42" tufter of Example 1 under the same conditions as used with this tufter in Example 1. The resulting carpet exhibited properties similar to those described with respect to Example 1.

EXAMPLE 5

Known carpet backing structures made from film were constructed and tufted along with a sample made in accordance with the teachings herein. All the samples except Sample D were composed of three layers. The outer layers were made from films molecularly oriented in one direction and the inner layer was molecularly oriented and laminated to the outer layers with its direction of orientation perpendicular to the direction of orientation of the outer layers. The tuft registration of the samples was compared and the results of that test are complied in the table below.

Sample A was a carpet backing made in accordance with the teaching of Example 1.

Sample B was a fibrillated film made substantially in accordance with the teaching of U.S. Pat. No. 3,484,916 to Johnstone issued on Dec. 23, 1969 and U.S. Pat. No. 3,428,506 to Johnstone issued Feb. 18, 1969 and similar to Canadian No. 944,116 to Jones issued on Mar. 26, 1974. Ensign Bickford polypropylene film with a melt flow index of 4.0 was extruded and then drawn at a ratio of 7 to 1 to a thickness of 2.0 mils (0.051 mm.). The film layers were secured by SH301 adhesive made by PNC Company of Akron, Ohio, a subsidiary of Inmont Corporation of Clifton, N.J. The adhesive was ethylene vinyl acetate having a basis weight of 9.5 grams per square meter between each layer.

This assembly was punched using a Hunter needle punch machine (U.S. Pat. No. 2,997,888) containing Torrington #78-1390-021 barbed needles at a density of 1.2 needles per square centimeter. One hundred punches per square centimeter were made. Since the punched sample had poor integrity it was post bonded by pressing it in Carver laboratory press at 120° C., 8700 kg./m.$^2$ for 2 minutes.

Sample C was a stitched film composite made substantially in accordance with the teaching of British Pat. No. 1,437,179 issued to Tough on May 26, 1976. Polypropylene film having a melt flow index of 4.0, was drawn to 2 mils (0.051 mm.) thick using a draw ratio of 6 to 1. The films were then stitched together with nylon monofilament thread having a denier of 360. The stitches were placed approximately 0.32 cm. apart.

Sample D was made of woven polypropylene marketed under the tradename Polybac, identical to the Polybac described in Example 1.

Sample E was a fibrillated ribbed film similar to that described in U.S. Pat. No. 3,841,951 issued to Kim on Oct. 15, 1974. To make this sample polypropylene with a melt flow index of 34 was extruded through a special die to produce a ribbed film. The die was made up of two halves each having spaced semiannular grooves with a diameter of 0.032 centimeters and 8 such regions per centimeter. The semi-annular grooves in the matching die halves were aligned but the die halves were spaced 0.18 millimeters from each other. The ribbed film which was then drawn to a draw ratio of 7 to 1 on a differential speed roll apparatus. The drawn film was partially fibrillated by passing it between a pair of softening rolls having mating ribbed surfaces.

The resulting fabric had a fiber denier of about 100. This is substantially in excess of that recommended in the Kim Patent No. (1.5 to 20) but the best that could be done on the equipment available. To the extent that this affects tuft registration the comparison herein may be inaccurate. However, it is believed that the larger diameter fibers produce a meaningful comparison to the structure produced in accordance with the teaching herein because the larger fibers and the film structure described herein both gain tuft registration by their ability to accept needles rather than to avoid them. The smaller fibered webs achieve tuft registration through needle avoidance—the ability of the fibers to move out from under the tufting needles. Thus the two carpet backings are compared herein with similar tuft registration inducing mechanisms in action.

The film layers were laminated together with 3M4693 adhesive in a total backing basis weight of 20 grams per square meter with approximately equal weights of adhesive between each layer. The sample was then calendered by a steam heated can at 130° C. for 30 seconds on each side.

All the samples were then tufted on the 42" tufter described in Example 1 in accordance with the practice described in Example 1 with respect to this tufter.

The tufted samples were evaluated for uniformity of tuft separation and length. Tuft separation is the distance between tuft portions in the carpet cross-direction and tuft length is the length of the tuft visible on the backstitch side in the machine direction. Seventy-two measurements were made on the backstitch side of each sample. The measurements were made at four equally spaced locations along the length of the sample in the carpet machine direction. The space between 18 consecutive tufts across the width were measured at each of the four locations. The tuft length of the 72 tufts were also measured. The tufts measured were made by the same tufting needles and the measurements were taken at identically located locations on the samples which were of identical length and width.

The standard deviations of tuft separation and tuft length were then calculated. In effect the standard deviation then measures the uniformity of tuft separation and tuft length. The results for all the samples are compiled in the table below. A difference in the standard deviation of tuft registration of $5 \times 10^{-3}$ centimeters between two samples exceeds the difference in standard deviation of tuft registration of the samples necessary to differentiate the degree of tuft registration of the samples with the unaided eye. The statistical confidence level is above 95% for all the standard deviations of all the samples except that of tuft separation of Sample C which has an 85% confidence level. The chart shows that the carpet backing constructed in accordance with the teachings of this disclosure has significantly better tuft registration than the other samples tested.

The chart also gives the tuft bind of each sample. From the chart it is seen that Sample A, made in accordance with this teaching, has comparable tuft bind to the other samples. Thus with Sample A better tuft registration is achieved with comparable tuft bind.

In short, the data shows that better tuft registration is achieved with comparable tuft bind and without the loss of strength that normally accompanies fibrillation. It is significant that these results are achieved with a backing made, unlike the other samples, without the necessity of undergoing a cumbersome extra step of fibrillation or weaving before tufting.

13, so that the cross-direction film formed the backstitch side and the spun bonded nonwoven formed the pile side. The film layers were bonded with 15 grams per square meter of pressure sensitive hot melt adhesive obtained from Union 76 marketed under the tradename Amsco 346. The adhesive was applied by a gravure printing process which applied 7.6 dots of adhesive per square centimeter to the machine direction film. After combining and compression at 8.2 kilograms per linear centimeter with cross-direction film, the adhesive area coverage was approximately 60%. The spunbonded nylon was adhesively secured with 3 grams per square meter of 3M 4693 as described in Example 1. The sample was lubricated with 2% by weight of a silicone lubricant obtained from Para Products marketed under the tradename of Paralese. The final backing basis weight was 120 grams per square meter.

The sample was tufted with the 42" tufter as described in Example 1. The spunbonded nylon did not adversely affect tuft registration. The sample had a bias tensile strength of 400 grams per centimeter and a bias modulus of 3300 grams per centimeter compared to the sample of Example 1 which exhibited bias tensile strength of 137 grams per centimeter and bias modulus of 460 grams per centimeter.

While particular embodiments of the present invention have been illustrated and described, it will be obvious to those skilled in the art that various changes and modifications can be made without departing from the spirit and scope of the invention and it is intended to cover, in the appended claims all such modifications that are within the scope of this invention.

What is claimed is:
1. A tufted material comprising:
  (a) tuft strand elements arranged in substantially orthogonally related sets of rows, and
  (b) a primary tufting substrate having needle holes therethrough and through which said tuft strand elements extend, said substrate comprising a bonded laminate having a plurality of layers of nonwoven materials, including two oppositely disposed surface layers, said substrate comprising first and second layers of uniaxially molecularly oriented polymeric material of substantially uniform thickness, each of said first and second layers having been drawn sufficiently to induce splitting parallel to its direction of molecular orientation upon penetration, said layers being split on both sides of each of the needle holes whereby each pair of adjacent rows of tuft portions in a direction which is parallel to the molecular orientation of one of said layers defines an elongate segment of primary tufting substrate in the layer, said segment being substantially uninterrupted between the adjacent pair of rows of tuft portions,

| Sample | Basis Weight (g/m²) | Tensile Strength (g/cm) | | | | Fiber Denier | Standard Deviation of Tuft Separation (cm) | Standard Deviation of Tuft Length (cm) | Unfinished Tuft Bind (g) |
| | | Before Tufting | | After Tufting | | | | | |
| | | MD | CD | MD | CD | | | | |
|---|---|---|---|---|---|---|---|---|---|
| A | 120 | 8,600 | 15,600 | 5,370 | 7,160 | — | .0287 | .0188 | 32 |
| B | 180 | 1,270 | 4,300 | 1,150 | 1,130 | 120 | .0465 | .0264 | 14 |
| C | 210 | 6,100 | 12,000 | 4,300 | 6,100 | — | .033 | .0292 | 45 |
| D | 120 | 14,900 | 11,600 | 11,100 | 8,200 | 500/1000 | .0361 | .0310 | 64 |
| E | 180 | 8,770 | 15,200 | 8,600 | 16,800 | 100 | .0410 | .0337 | 9.1 |

EXAMPLE 6

A carpet backing having two layers of molecularly oriented film and one layer of fibrous nonwoven material was prepared. The machine direction film layer was a foamed film identical to those in Example 1. The cross-direction film layer was nonfoamed as described in Example 2 except the film had a thickness of two mils and a basis weight of 50 grams per square meter. The fibrous nonwoven material was a continuous filament spunbonded nylon marketed under the tradename of Cerex by Monsanto. The spunbonded nylon was a sheet of continuous filament 6, 6 nylon fibers and had a basis weight of 17 grams per square meter, tensile strength of 1300 grams per centimeter in the machine direction and 500 grams per centimeter in the cross machine direction, tear strength (Elmendorf) of 900 grams, and fiber denier of 4. The layers were arranged, as shown in FIG.

(1) said first layer located intermediate said surface layers and having the direction of molecular orientation thereof parallel to the tufting machine direction, (2) said second layer having the direction of molecular orientation substantially at right angles to that of said first layer, (3) said surface layers of said bonded laminate being made of materials other than uniaxially molecularly oriented polymeric material having a direction of molecular orientation which is parallel to the tufting machine direction.

2. The tufted material of claim 1 wherein a third layer of said primary tufting substrate comprises a uniaxially molecularly oriented polymeric material, the direction of molecular orientation of which is substantially at right angles to said first layer.

3. The tufted material of claim 1 wherein said primary tufting substrate comprises four layers of uniaxially molecularly oriented polymeric material and includes a third layer of material having a direction of molecular orientation arranged at about 45° to said machine direction layer, and a fourth layer having its direction of molecular orientation arranged substantially perpendicular to the direction of molecular orientation of said third layer.

4. The tufted material of claim 3 wherein said fourth layer forms the backstitch side of said substrate.

5. The tufted material of claim 1 wherein a third layer is a fibrous, nonwoven material.

6. The tufted material of claim 5 wherein said fibrous, nonwoven material is a spunbonded material.

7. The tufted material of claim 1 wherein said oriented polymeric material of at least one layer is foamed plastic film having bubbles within.

* * * * *

UNITED STATES PATENT AND TRADEMARK OFFICE
CERTIFICATE OF CORRECTION

PATENT NO. : 4,294,876
DATED : October 13, 1981
INVENTOR(S) : JAMES B. CAMDEN and KENNETH D. VINSON It is certified that error appears in the above-identified patent and that said Letters Patent are hereby corrected as shown below:

Column 6, line 29, "or" should read -- of --.

Column 8, line 66, "examle" should read -- example --.

Column 11, line 52, "42'" should read -- 42" --.

Column 12, line 57, "were" should read -- was --.

Column 13, line 58, "complied" should read -- compiled --.

Signed and Sealed this

Second Day of February 1982

[SEAL]

Attest:

GERALD J. MOSSINGHOFF

Attesting Officer    Commissioner of Patents and Trademarks